United States Patent
Chen et al.

(10) Patent No.: US 11,563,240 B2
(45) Date of Patent: Jan. 24, 2023

(54) SAMPLING CIRCUIT BOARD FOR BATTERY MODULE AND BATTERY MODULE

(71) Applicant: Contemporary Amperex Technology Co., Limited, Ningde (CN)

(72) Inventors: Sien Chen, Ningde (CN); Shoujiang Xu, Ningde (CN); Chunyan Feng, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 171 days.

(21) Appl. No.: 17/043,724

(22) PCT Filed: Dec. 27, 2019

(86) PCT No.: PCT/CN2019/129290
§ 371 (c)(1),
(2) Date: Sep. 30, 2020

(87) PCT Pub. No.: WO2020/155988
PCT Pub. Date: Aug. 6, 2020

(65) Prior Publication Data
US 2021/0203012 A1     Jul. 1, 2021

(30) Foreign Application Priority Data
Jan. 30, 2019   (CN) ........................... 201920713110.8

(51) Int. Cl.
*H01M 10/42*  (2006.01)
*H01M 50/519* (2021.01)
(Continued)

(52) U.S. Cl.
CPC ....... *H01M 10/425* (2013.01); *H01M 50/207* (2021.01); *H01M 50/284* (2021.01);
(Continued)

(58) Field of Classification Search
None
See application file for complete search history.

(56) References Cited

U.S. PATENT DOCUMENTS

2014/0322935 A1   10/2014   Filman et al.
2015/0171384 A1   6/2015    Kim

FOREIGN PATENT DOCUMENTS

CN   202009085 U   10/2011
CN   203839479 U   9/2014
(Continued)

OTHER PUBLICATIONS

PCT International Search Report for PCT/CN2019/129290, dated Apr. 8, 2020, 12 pages.
(Continued)

*Primary Examiner* — Carmen V Lyles-Irving
(74) *Attorney, Agent, or Firm* — East IP P.C.

(57) ABSTRACT

The present disclosure discloses to a sampling circuit board for a battery module and a battery module. The sampling circuit board for a battery module comprises a main board comprising a plurality of electrical connection areas; and a plurality of sampling terminals respectively electrically connected to the plurality of the electrical connection areas, and an end of each of the sampling terminals extends away from the main board, and each of the sampling terminals connected to one of the electrical connection areas of the main board via a connection member, wherein the connection member comprises a main body and at least one hook assembly provided on the main body, and the hook assembly laminates and attaches one of the sampling terminals and one of the electrical connection areas of the main board.

7 Claims, 3 Drawing Sheets

(51) Int. Cl.
- *H01M 50/543* (2021.01)
- *H01M 50/505* (2021.01)
- *H01M 50/284* (2021.01)
- *H01M 50/207* (2021.01)

(52) U.S. Cl.
CPC ....... *H01M 50/505* (2021.01); *H01M 50/519* (2021.01); *H01M 50/543* (2021.01)

(56) References Cited

FOREIGN PATENT DOCUMENTS

| | | |
|---|---|---|
| CN | 205609644 U | 9/2016 |
| CN | 207199734 U | 4/2018 |
| CN | 209730082 U | 12/2019 |

OTHER PUBLICATIONS

The extended European search report for EP Application No. 19912443.9, dated Jun. 10, 2021, 6 pages.

The First Examination Report for Europe Application No. 19912443.9, dated Nov. 12, 2021, 4 pages.

SAMPLING CIRCUIT BOARD FOR BATTERY MODULE AND BATTERY MODULE

CROSS REFERENCE TO RELATED APPLICATIONS

The present disclosure is a National Stage of International Application No. PCT/CN2019/129290, which claims priority from a Chinese patent application No. 201920171310.8, entitled "Sampling Circuit Board and Battery Module", filed on Jan. 30, 2019, both of which are incorporated herein by reference in their entireties.

TECHNICAL FIELD

The present disclosure relates to the field of a battery, and in particular, to a sampling circuit board for a battery module and a battery module.

BACKGROUND

The voltage sampling and thermal management system inside a battery is the core unit of the battery management system. The voltage and temperature sampling in a traditional battery module is collected through a harness isolation board. However, due to a cumbersome manufacturing process, it is not easy for the harness isolation board to be produced automatically and with high efficiency and low cost, and the market's competitive needs cannot be met.

In the related art, a flexible circuit board may be used as a sampling circuit board to replace a conventional harness isolation board. The sampling circuit board includes a main board and a plurality of sampling terminals protruding outward from the main board.

At present, a connection process between the main board and the sampling terminals in the sampling circuit board includes brazing, riveting, dispensing and etc. The brazing process is relatively complicated, and the connection area is large, which is not beneficial to the structure design of the module sampling. The riveting combined the dispensing process is complicated, and the structural adhesive may penetrate between the two electrical connection surfaces in the dispensing process, which may increase the contact resistance of the sampling connection.

Therefore, a sampling circuit board for a battery module and a battery module with higher connection stability between the main board and the sampling terminals are desired.

SUMMARY

The present disclosure provides a sampling circuit board for a battery module and a battery module, which improve the connection stability of the main board and the sampling terminals of the sampling circuit board.

In one aspect, an embodiment of the present disclosure provides a sampling circuit board for a battery module, comprising: a main board comprising a plurality of electrical connection areas; and a plurality of sampling terminals respectively electrically connected to the plurality of the electrical connection areas, and an end of each of the sampling terminals extends away from the main board, and each of the sampling terminals connected to one of the electrical connection areas of the main board via a connection member, wherein the connection member comprises a main body and at least one hook assembly provided on the main body, and the hook assembly laminates and attaches one of the sampling terminals and one of the electrical connection areas of the main board.

According to any of the above embodiments of an aspect of the present disclosure, the hook assembly comprises two hook structures, each of the hook structures comprises a bent portion and a pressing portion, and the bent portion connects the pressing portion and the main body, so that a space is formed between the pressing portion and the main body, and wherein the space is used to receive part of one of the sampling terminals and part of one of the electrical connection areas of the main board.

According to any of the above embodiments of an aspect of the present disclosure, the main body comprises a first boundary and a second boundary opposite to each other, both the first boundary and the second boundary extend along a first direction, and the two bent portions of the hook assembly are respectively connected to the first boundary and the second boundary.

According to any of the above embodiments of an aspect of the present disclosure, each of the sampling terminals is provided with two or more first openings arranged at intervals, and each of the sampling terminals is provided with an abutting portion formed between the two or more first openings, and the electrical connection areas are located between the sampling terminals and the main body, the bent portions pass through the first openings, and the pressing portion abuts the abutting portion, so that one of the sampling terminals and one of the electrical connection areas of the main board are laminated and attached to the main body.

According to any of the above embodiments of an aspect of the present disclosure, the number of the hook assemblies is two or more, the hook assemblies are arranged along the first direction, and the abutting portion extends along the first direction.

According to any of the above embodiments of an aspect of the present disclosure, each of the electrical connection areas of the main board is provided with two or more second openings arranged at intervals, and the bent portion passes through the second openings, wherein the shape of the second opening matches that of the cross section of the bent portions cut with a surface parallel to the electrical connection areas.

According to any of the above embodiments of an aspect of the present disclosure, the main board comprises a first surface and a second surface opposite to each other, and the plurality of the electrical connection areas are provided on the first surface of the main board, and the main body of the connection member is located on a side of the second surface of the main board, the hook assembly passes from the second surface of the main board through the electrical connection areas of the main board and the sampling terminals, and the hook assembly presses one of the sampling terminals and one of the electrical connection areas of the main board toward the main body.

According to any of the above embodiments of an aspect of the present disclosure, the sampling circuit board further comprises a connection terminal provided on the second surface of the main board.

In another aspect, the present disclosure provides a battery module comprising a plurality of single cells stacked; and the sampling circuit board for a battery module according to any one of the above, wherein the sampling terminals of the sampling circuit board are electrically connected to the single cells.

According to any of the above embodiments of another aspect of the present disclosure, the battery module further comprises a bus bar electrically connecting two or more of the single cells, and each of the sampling terminals comprises a first area and a second area connected with each other, wherein the first area is connected to one of the electrical connection areas of the main board through the connection member, and the second area extends away from the main board and is connected to the bus bar.

In the sampling circuit board for a battery module according to the embodiment of the present disclosure, the sampling terminals are connected to the electrical connection areas of the main board via the connection member, wherein the hook assembly included in the connection member stacks and attaches the sampling terminals and the electrical connection areas of the main board and a stable connection between the sampling terminals and the electrical connection areas is achieved. The sampling circuit board of the embodiment of the present disclosure uses the connection member with the hook assembly to replace connection processes, such as soldering and traditional tension riveting. Therefore, the connection process is simple and the problem of the circuit board or a riveting part in the traditional tension riveting process easily to be torn can be avoided.

In some optional embodiments, each of the sampling terminals is provided with an abutting portion between the two or more first openings, and the pressing portion of the connection member abuts the abutting portion, so that one of the sampling terminals and one of the electrical connection areas of the main board are laminated and attached. The number of the hook assemblies is more than two, the hook assemblies are arranged along the first direction, and the abutting portion extends in the first direction, which avoids the problem of relative rotation of the sampling terminals relative to the electrical connection areas of the main board after they are connected and improves the stability of the connection.

BRIEF DESCRIPTION OF THE DRAWINGS

Other features, objects, and advantages of the present disclosure will become more apparent by reading the following detailed description of non-limiting embodiments with reference to the accompanying drawings, in which the same or similar reference numbers denote the same or similar features.

DETAILED DESCRIPTION

In order to make the purpose, technical solution, and advantages of the present disclosure clearer, the present disclosure is described in further detail below with reference to the accompanying drawings and specific embodiments. It should be understood that the specific embodiments described herein are only configured to explain and not limit the present disclosure. For those skilled in the art, the present disclosure can be implemented without some of these specific details.

It should be noted that in the context, relational terms, such as first and second, are used only to distinguish one object or operation from another object or operation, and do not necessarily require or imply that there is any such actual relationship or order among these objects or operations. Moreover, the terms "including", "comprising", or any other variation thereof are intended to encompass non-exclusive inclusion, such that a process, method, article, or device that includes a series of elements includes not only those elements but also those that are not explicitly listed or other elements inherent to such process, method, article, or device. Without more restrictions, the elements defined by the sentence "including . . . " do not exclude the existence of other identical elements in the process, method, article, or device including the elements.

It should be understood that in the description of the structure of a component, when a layer or a region is described to be "above" or "on" another layer or another region, it may mean the layer or one region is directly on another layer or another region, or there are other layers or regions between the layer or one region and another layer or region. And, if the component is turned over, the layer or region will be "under" or "below" another layer or region.

Embodiments of the present disclosure provide a sampling circuit board for a battery module and a battery module, wherein the sampling circuit board is disposed in the battery module and is used for sampling information, such as voltage signals and temperature signals, to facilitate battery management.

Figure 1:
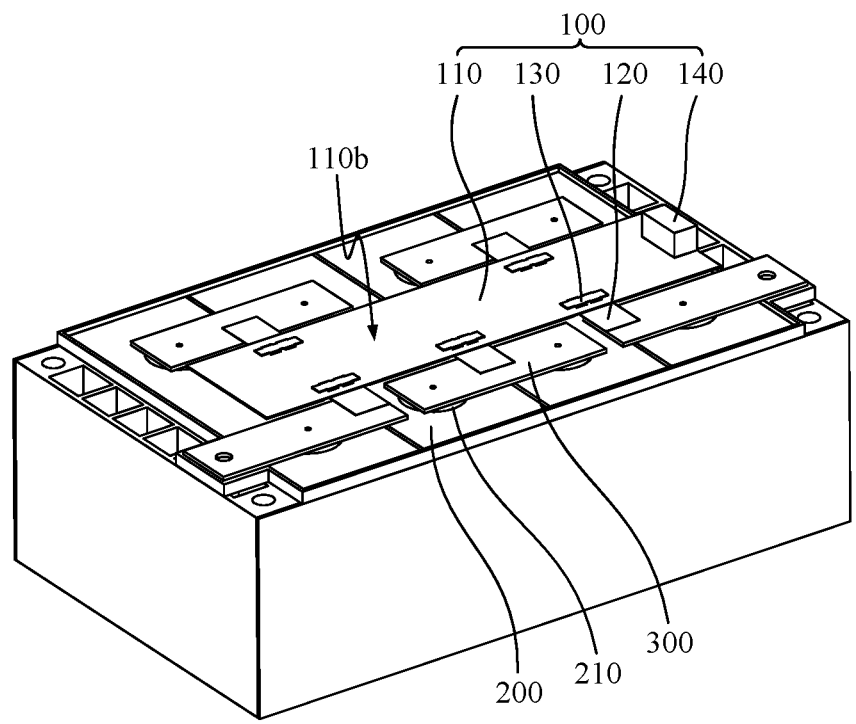
FIG. 1 shows a perspective view of a battery module according to an embodiment of the present disclosure.

FIG. 1 shows a perspective view of a battery module according to an embodiment of the present disclosure. The battery module includes a plurality of single cells 200 and a sampling circuit board 100 for the battery module. The plurality of single cells 200 are stacked. In the perspective view shown in FIG. 1, the plurality of single cells 200 are located in a surrounding frame. Each single cell 200 includes an electrode terminal 210. Wherein the sampling circuit board 100 and the electrode terminal 210 are electrically connected to collect parameters of the single cell 200. Wherein the single cell 200 may be a can-type secondary battery or a pouch-type secondary battery. In this embodiment, the can-type secondary battery is used as an example for description.

Figure 2:
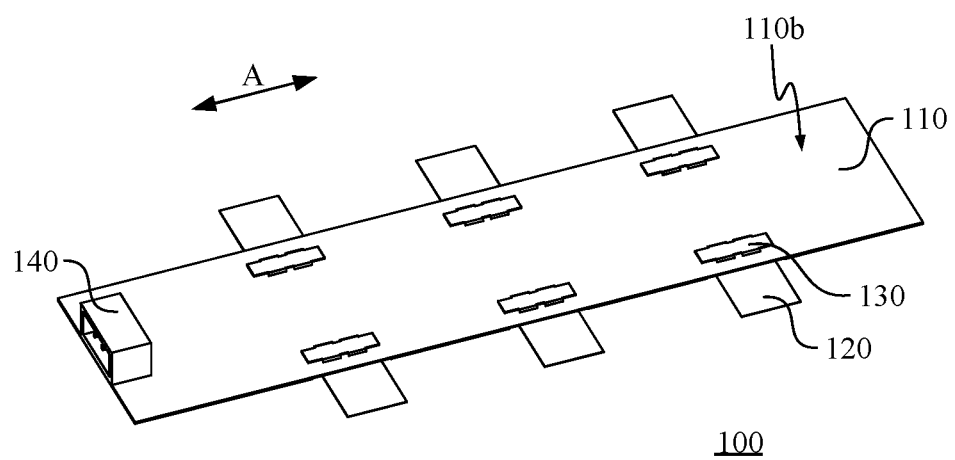
FIG. 2 shows a perspective view of a sampling circuit board for a battery module according to an embodiment of the present disclosure.
Figure 3:
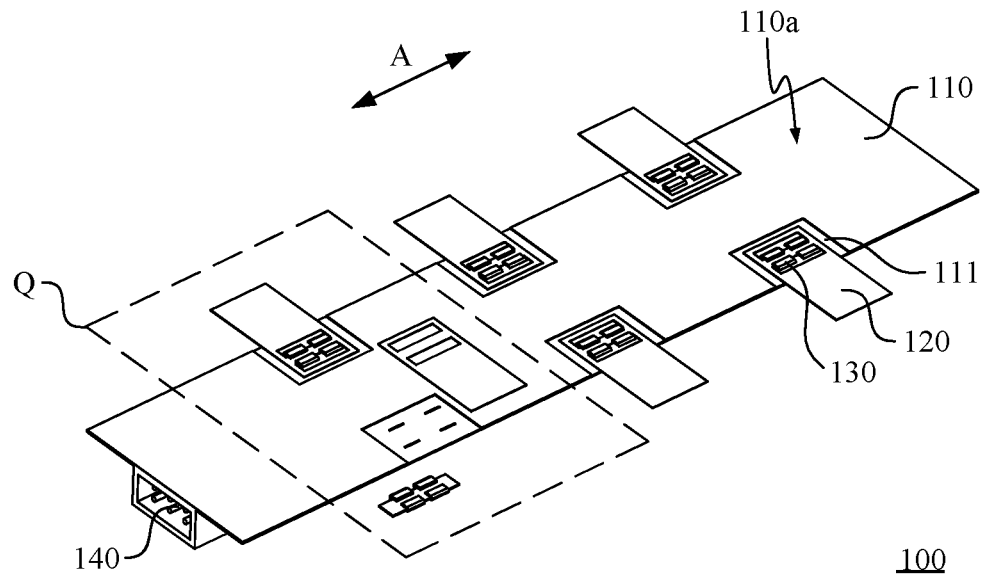
FIG. 3 illustrates an exploded perspective view of a sampling circuit board for a battery module according to an embodiment of the present disclosure.

FIG. 2 and FIG. 3 respectively show a perspective view and an exploded perspective view of a sampling circuit board for a battery module according to an embodiment of the present disclosure, wherein FIG. 2 and FIG. 3 respectively show a detailed structure of two opposite surfaces of the sampling circuit board for a battery module. The sampling circuit board 100 for a battery module in this embodiment includes a main board 110 and a plurality of sampling terminals 120.

The main board 110 may be configured as a flexible printed circuit (FPC), and in other embodiments, it may also be configured as a non-flexible printed circuit board (PCB). The sampling terminal 120 may be a metal sheet, and in some other embodiments, it may also be a sheet conductor made of other conductive materials.

The main board 110 includes a plurality of electrical connection areas 111. In some embodiments, the electrical connection areas 111 may be conductive areas exposed on the surface of the main board 110. In this embodiment, the electrical connection areas 111 are exposed portions of copper foil on the FPC. The plurality of sampling terminals 120 are electrically connected to the plurality of electrical connection areas 111 respectively. An end of the sampling terminal 120 extends away from the main board 110. Each sampling terminal 120 is connected to the electrical connection area 111 of the main board 110 via a connection member 130.

Continue to refer to FIG. 1. According to the battery module of the embodiment of the present disclosure, the sampling terminals 120 of the sampling circuit board 100 are electrically connected to the single cells 200. Specifically, the sampling terminals 120 are directly or indirectly connected to the electrode terminals 210 of the single cells 200. The sampling circuit board 100 collects parameters of the plurality of single cells 200 via the sampling terminals 120.

In some embodiments, the battery module further includes a bus bar 300, wherein the bus bar 300 is electrically connected to two or more single cells 200. Specifically, the bus bar 300 is electrically connected to electrode terminals 210 of the two or more single cells 200. The sampling terminal 120 may include a first area and a second area connected to each other. The first area is connected to each of the electrical connection areas 111 of the main board 110 via the connection member 130, and the second area extends away from the main board 110 and is connected to the bus bar 300.

It can be understood that the sampling terminals 120 of the circuit board 100 are not limited to be connected to the single cells 200 via the bus bar 300. In some embodiments, the sampling terminals 120 may also be directly connected to the single cells 200.

Figure 4:
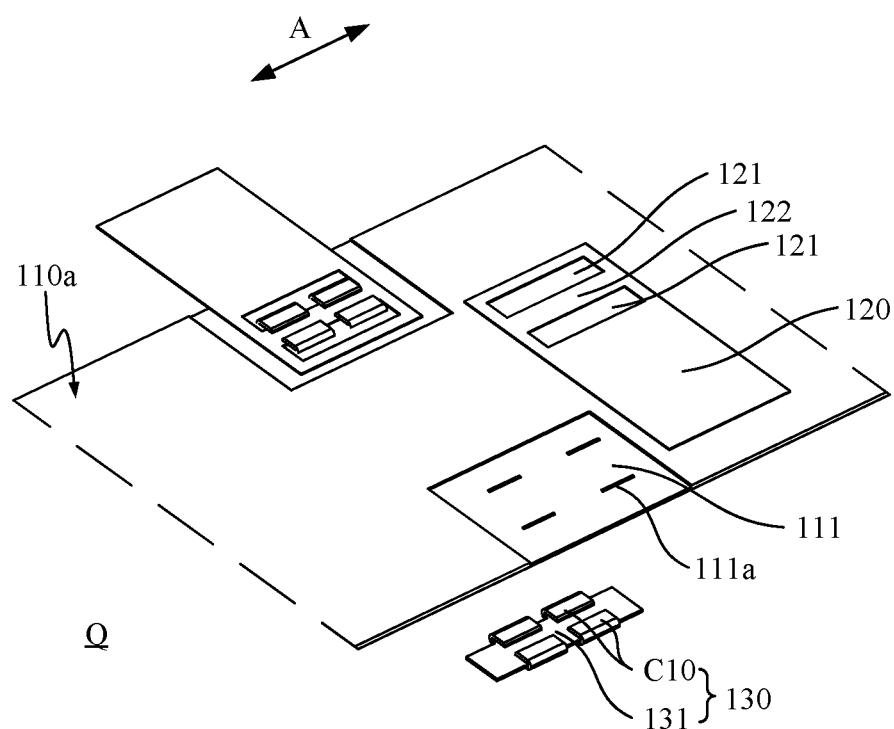
FIG. 4 shows a partially enlarged view of a Q region in FIG. 3.
Figure 5:
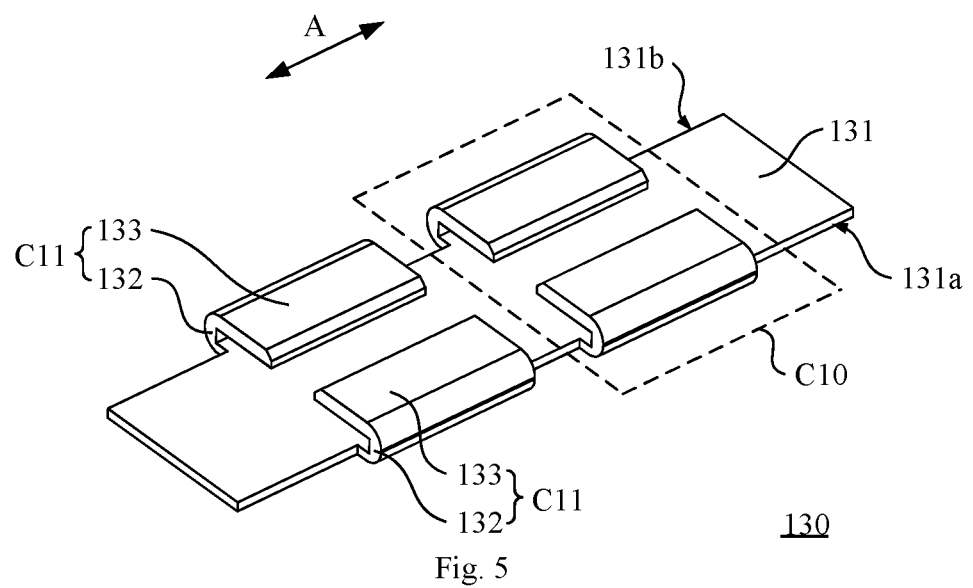
FIG. 5 shows a perspective view of a connection member in a sampling circuit board for a battery module according to an embodiment of the present disclosure.

FIG. 4 is a partially enlarged view of a Q region in FIG. 3, and FIG. 5 is a perspective view of a connection member in a sampling circuit board for a battery module according to an embodiment of the present disclosure. In this embodiment, the connection member 130 includes a main body 131 and at least one hook assembly C10. The at least one hook assembly C10 is disposed on the main body 131. Each hook assembly C10 laminates and attaches one of the sampling terminals 120 and one of the electrical connection areas 111 of the main board 110.

In the sampling circuit board 100 and the battery module according to the embodiment of the present disclosure, the sampling terminals 120 are connected to the electrical connection areas 111 of the main board 110 via the connection member 130, wherein the hook assembly C10 included in the connection member 130 laminates and attaches one of the sampling terminals 120 and one of the electrical connection areas 111 of the main board 110 to achieve stable connection between the sampling terminals 120 and electrical connection areas 111.

In the traditional sampling circuit board, the connection process between the main board and the sampling terminals adopts brazing, riveting, dispensing, etc. Among them, the traditional riveting process realizes the riveting of the main board and the sampling terminals by means of tension. The circuit board or riveting part is easily to be torn after riveting. The sampling circuit board 100 in the embodiment of the present disclosure replaces the connection process, such as soldering and traditional tension riveting, by the connection member 130 with the hook assembly C10. The connection process is simple, and the connection structure using tension force is replaced by laminating, attaching and pressing. The problem of the circuit board or a riveting part in the traditional tension riveting process easily to be torn can be avoided.

In this embodiment, each hook assembly C10 includes two hook structures C11. Each of the hook structures C11 includes a bent portion 132 and a pressing portion 133. The bent portion 132 connects the pressing portion 133 and the main body 131, so that a space is formed between the portion 133 and the main body 131, and the space is used to receive part of one of the sampling terminals 120 and part of one of the electrical connection areas 111 of the main board 110.

The main body 131 may include a first boundary 131a and a second boundary 131b opposite to each other. Both the first boundary 131a and the second boundary 131b extend in the first direction A. The two bent portions 132 of each hook assembly C10 are respectively connected to the first boundary 131a and the second boundary 131b.

The main body 131 of the connection member 130 in this embodiment is rectangular, and the first boundary 131a and the second boundary 131b respectively correspond to a pair of long sides of the rectangle. The two hook structures C11 included in each hook assembly C10 can be symmetrically arranged. The two bent portions 132 of the hook structures C11 are bent toward each other, so that part of one of the sampling terminals 120 and part of one of the electrical connection areas 111 laminated and attached are limited between the bent portions 132 of the two hook structures C11 and thereby the connection between the sampling terminals 120 and the electrical connection areas is more stable.

It can be understood that, in other embodiments, the shape of the main body 131 may be adjusted according to actual design requirements, and the two hook structures C11 included in each hook assembly C10 may also be arranged asymmetrically.

As shown in FIG. 3 and FIG. 4, each of the sampling terminals 120 in this embodiment is provided with two or more first openings 121 arranged at intervals. Each of the sampling terminals 120 is provided with an abutting portion 122 between the two or more first openings 121. When the connection member 130 connects the sampling terminals 120 with the electrical connection areas 111 of the main board 110, the electrical connection areas 111 are located between the sampling terminals 120 and the main body 131, and the bent portions 132 of the hook assembly C10 pass through the first openings 121. The pressing portions 133 are in contact with the abutting portions 122 of the sampling terminals 120, so that one of the sampling terminals 120 and one of the electrical connection areas 111 of the main board 110 are laminated and attached to the main body 131.

In some embodiments, the number of the hook assemblies C10 of each connection member 130 is two or more, and the hook assemblies C10 are arranged along the first direction A. On the sampling terminals 120, the abutting portions 122 also extend along the first direction A.

Specifically, in this embodiment, each sampling terminal 120 is provided with two first openings 121. The bent portions 132 of the two or more hook structures C1 connected to the first boundary 131a in the corresponding connection member 130 pass through one of the first openings 121, and the two bent portions 132 of the two or more hook structures C1 connected to the second boundary 131b pass through the other of the first openings 121. The strip-shaped abutting portion 122 extending along the first direction A is formed between the two first openings 121, and the pressing portions 133 of the plurality of hook structures C1 in the corresponding connection member 130 abut against the strip-shaped abutting portion 122. According to the above structure, the mutual movement between the electrical connection areas 111 of the main board 110, the sampling terminals 120, and the connection member 130 is limited in the first direction A, so that the sampling terminals 120 and the electrical connection areas 111 of the main board 110 are prevented from rotating relative to each other and the stability of the connection is improved.

As shown in FIG. 3 and FIG. 4, in the embodiment, each of the electrical connection areas 111 of the main board 110 is provided with two or more second openings 111a arranged at intervals. The bent portions 132 of the hook assembly C10 pass through the second openings 111a. The shape of the second openings 111a matches that of the cross section of the curved portion 132 cut with a surface parallel to the electrical connection areas 111, so that the bent portions 132 of each hook assembly C10 can pass through the electrical connection areas 111 of the main board 110 to facilitate the connection. At the same time, the bent portions 132 of each hook assembly C10 are restricted by the second openings 111a with a matched shape, to prevent unnecessary movement of the bent portions, and thus a reliable connection structure is obtained in the electrical connection areas 111 of the main board 110, the sampling terminals 120, and the connection member 130.

Referring to FIGS. 1 to 3, the main board 110 includes a first surface 110a and a second surface 110b opposite to each other, wherein the plurality of electrical connection areas 111 are disposed on the first surface 110a of the main board 110. The main body 131 of the connection member 130 is located on a side of the second surface 110b of the main board 110. The hook assembly C10 passes from the second surface 110b of the main board 110 through the electrical connection areas 111 of the main board 110 and the sampling terminals 120, and the hook assembly C10 presses the sampling terminals 120 and the electrical connection areas 111 of the main board 110 toward the main body 131. In addition, the sampling circuit board 100 may further include a connection terminal 140 disposed on the second surface 110b of the main board 110.

According to the sampling circuit board 100 of this embodiment described above, when the sampling circuit board 100 is disposed in a battery module, the first surface 110a of the main board 110 faces the plurality of single cells 200, thereby facilitating the electrical connection between the sampling terminals 120 and the single cells 200. The second surface 110b of the main board 110 faces away from the plurality of single cells 200, thereby avoiding the problem of interference between the large-sized connection terminal 140 and the plurality of single cells 200 at the main board 110.

It should be noted that, in the above-mentioned embodiment of the present disclosure, the hook assembly C10 of the connection member 130 passes through the electrical connection areas 111 of the main board 110 and the sampling terminals 120, so that the connection areas 111 and the sampling terminals 120 are pressed toward the main body 131 of the connection member 130 to be connected in a laminated and attached manner. Accordingly, each of the sampling terminals 120 may be provided with the first openings 121 through which the hook assembly C10 passes, and the electrical connection areas 111 of the main board 110 may be provided with the second openings 111a through which the hook assembly C10 passes. However, in other embodiments, the hook component C10 of the connection member 130 may not pass through the electrical connection areas 111 of the main board 110 and/or the sampling terminals 120, but pass around edge areas of the electrical connection areas 111 of the main board 110 and/or the sampling terminals 120. Accordingly, the electrical connection areas 111 of the main board 110a and/or the sampling terminal 120 may not be provided with an opening for the hook assembly C10 to pass through, and only need to be provided with edge areas corresponding to the hook assembly C10.

According to the embodiments of the present application as described above, these embodiments do not describe all the details in detail, nor are they limited to the specific embodiments described. Obviously, many modifications and changes can be made according to the above description. These embodiments are selected and described specifically in this specification in order to better explain the principles and practical applications of the present application, so that those skilled in the art can make good use of this application and modify and use it based on this application. This application is limited only by the claims and their full scope and equivalents.

What is claimed is:

1. A sampling circuit board for a battery module, comprising:
   a main board comprising a plurality of electrical connection areas; and
   a plurality of sampling terminals respectively electrically connected to the plurality of the electrical connection areas, and an end of each of the sampling terminals extends away from the main board, and each of the sampling terminals connected to a respective one of the electrical connection areas of the main board via a respective connection member,
   wherein the connection member comprises a main body and at least one hook assembly provided on the main body, and the hook assembly stacks and bonds one of the sampling terminals and one of the electrical connection areas of the main board, and
   the hook assembly comprises two hook structures, each of the hook structures comprises a bent portion and a pressing portion, and the bent portion connects the pressing portion and the main body, so that a space is formed between the pressing portion and the main body, and wherein the space is used to receive part of one of the sampling terminals and part of one of the electrical connection areas of the main board, and
   the main body comprises a first boundary and a second boundary opposite to each other, both the first boundary and the second boundary extend along a first direction, the two bent portions of the hook assembly are respectively connected to the first boundary and the second boundary, each of the electrical connection areas of the main board is provided with two or more second openings arranged at intervals, the bent portion passes through the second openings, and the shape of the second openings matches that of the cross section of the bent portion cut with a surface parallel to the electrical connection areas.

2. The sampling circuit board according to claim 1, wherein each of the sampling terminals is provided with two or more first openings arranged at intervals, and each of the sampling terminals is provided with an abutting portion formed between the two or more first openings, and
   the electrical connection areas are located between the sampling terminals and the main body, the bent portions pass through the first openings, and the pressing portion abuts the abutting portion, so that one of the sampling terminals and one of the electrical connection areas of the main board are stacked and bonded to the main body.

3. The sampling circuit board according to claim 2, wherein the number of the hook assemblies is two or more, the hook assemblies are arranged along the first direction, and the abutting portion extends along the first direction.

4. The sampling circuit board according to claim 1, wherein the main board comprises a first surface and a second surface opposite to each other, and the plurality of the electrical connection areas are provided on the first surface of the main board, and the main body of the connection member is located on a side of the second surface of the main board, the hook assembly passes from the second surface of the main board through the electrical connection areas of the main board and the sampling terminals, and the hook assembly presses one of the sampling terminals and one of the electrical connection areas of the main board toward the main body.

5. The sampling circuit board according to claim 4, further comprising:

a connection terminal provided on the second surface of the main board.

6. A battery module, comprising:

a plurality of single cells stacked; and the sampling circuit board for a battery module according to claim 1, wherein the sampling terminals of the sampling circuit board are electrically connected to the single cells.

7. The battery module according to claim 6, further comprising a bus bar electrically connecting two or more of the single cells, and each of the sampling terminals comprises a first area and a second area connected with each other, wherein the first area is connected to one of the electrical connection areas of the main board through the connection member, and the second area extends away from the main board and is connected to the bus bar.

* * * * *

UNITED STATES PATENT AND TRADEMARK OFFICE
CERTIFICATE OF CORRECTION

| | |
|---|---|
| PATENT NO. | : 11,563,240 B2 |
| APPLICATION NO. | : 17/043724 |
| DATED | : January 24, 2023 |
| INVENTOR(S) | : Sien Chen, Shoujiang Xu and Chunyan Feng |

It is certified that error appears in the above-identified patent and that said Letters Patent is hereby corrected as shown below:

On the Title Page

Item [30], delete "20192071310.8" and insert -- 201920171310.8 -- therefor.

Signed and Sealed this
Twelfth Day of September, 2023

Katherine Kelly Vidal
*Director of the United States Patent and Trademark Office*